United States Patent [19]

Scherowsky et al.

[11] Patent Number: 5,288,425

[45] Date of Patent: Feb. 22, 1994

[54] FERROELECTRIC, LIQUID-CRYSTALLINE POLYMERS, A PROCESS FOR THEIR PREPARATION AND THEIR USE IN ELECTROOPTICAL COMPONENTS

[75] Inventors: Günter Scherowsky; Andreas Schliwa; Wolfgang Trapp, all of Berlin, Fed. Rep. of Germany

[73] Assignee: Hoechst Aktiengesellschaft, Frankfurt am Main, Fed. Rep. of Germany

[21] Appl. No.: 635,180

[22] PCT Filed: Jun. 29, 1989

[86] PCT No.: PCT/EP89/00745

§ 371 Date: Jan. 3, 1991

§ 102(e) Date: Jan. 3, 1991

[87] PCT Pub. No.: WO90/00584

PCT Pub. Date: Jan. 25, 1990

[30] Foreign Application Priority Data

Jul. 8, 1988 [DE] Fed. Rep. of Germany ....... 3823154

[51] Int. Cl.$^5$ ............. C09K 19/52; C09K 19/34; C09K 19/12; C08G 63/00
[52] U.S. Cl. ................ 252/299.01; 528/176; 528/191; 252/299.61; 252/299.66
[58] Field of Search ......... 252/299.01, 299.61, 252/299.6; 528/176, 191

[56] References Cited

FOREIGN PATENT DOCUMENTS 0231770 8/1987 European Pat. Off. .
0365255 4/1990 European Pat. Off. .
3183440 7/1988 Japan .

OTHER PUBLICATIONS

J. Polym. Sci. Polym. Lett. 13, p. 243 (1975).
Polym. Bull. 6, p. 309 (1982).

Primary Examiner—Robert L. Stoll
Assistant Examiner—C. Harris
Attorney, Agent, or Firm—Curtis, Morris & Safford

[57] ABSTRACT

A ferroelectric, liquid-crystalline polymer is composed of repeating units of the formula (I)

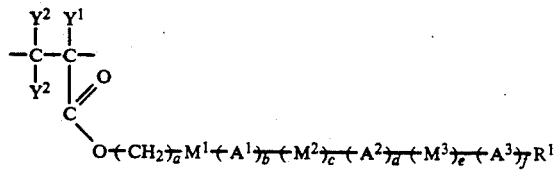

in which
$Y^1$ = H, $CH_3$ or F
$Y^2$ = H or F
$R^1$ =

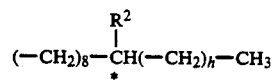

or an achiral alkyl having 2 to 16 carbon atoms, and
$R^3$ = H or $CH_3$
$R^2$ = $CH_3$, Cl or CN
g and h = an integer from 0 to 10
a = 2 to 20, preferably 6 to 12
b,c,d,e and f = 0 or 1, where d+e+f = 2 or 3
$A^1$, $A^2$ and $A^3$ = for example, 1,4-phenylene in which one or two hydrogen atoms may be substituted by F, Cl and/or CN, 1,4-cyclohexylene and
$M^1$, $M^2$ and $M^3$ = for example, CO—O or O—CO.

These liquid-crystalline polymers have short response times and high resistance to mechanical stresses. They can be prepared by free-radical polymerization.

4 Claims, No Drawings

FERROELECTRIC, LIQUID-CRYSTALLINE POLYMERS, A PROCESS FOR THEIR PREPARATION AND THEIR USE IN ELECTROOPTICAL COMPONENTS

DESCRIPTION

Liquid crystals have recently come into use in a variety of technical fields in which there is a requirement for certain electrooptical properties (for example low triggering voltages) combined with certain requirements concerning display or switching devices (for example flat construction, low weight). These devices currently utilize dielectric alignment effects in nematic, cholesteric and/or smectic liquid-crystal phases, the light transparency or reflectivity of the device being dependent on the electrical voltage applied.

A liquid-crystal display consists of two supporting plates, preferably glass plates, which are coated with transparent electrodes and, as a rule, with one or two alignment layers between which the liquid-crystal layer is located. Other components such as polarizers, color filters, passivating layers, anti-reflection layers, diffusion barrier layers and the like are in common use.

Although currently nematic or cholesteric liquid-crystal phases are still predominantly used, for some years ferroelectric, in particular smectic C*, liquid-crystal phases have been gaining in importance.

Ferroelectric liquid crystals have the advantage of very short response times and allow high-resolution screens to be operated without the assistance of electronic elements, such as for example thin-layer transistors, which are necessary when using nematic or cholesteric liquid-crystal phases.

In all the above applications, the liquid crystals are low-molecular-weight liquid-crystalline compounds, i.e. having molecular weights of below 2000 g/mol, preferably below 800 g/mol, and in particular they are not polymers, copolymers, polycondensates or copolycondensates. Owing to their low viscosity, low-molecular-weight liquid crystals generally have the advantage of short response times; this is particularly true of ferroelectric liquid crystals, whose response times are in the range of μs and which therefore respond 10 to 1000 times faster than conventional nematic liquid-crystal phases.

However, on using ferroelectric liquid crystals, the problem of high susceptibility of the alignment to mechanical stress (shock, impact, pressure, heat distortion, bending and so on) can occur, which can lead to irreversible disruption of the image quality of a display. Currently, this high susceptibility impedes the construction of flexible ferroelectric LC displays and increases the cost of production of conventional displays, i.e. those with glass or rigid plastic plates.

It is advantageous to use polymeric liquid crystals owing to their lower deformability and better processibility.

Although polymeric liquid crystals have already been described on several occasions (for example J. Polym. Sci. Polym. Lett. Ed. 13, 243 (1975); Polym. Bull. 6, 309 (1982)), the polymeric liquid crystals which have been described up till now have response times which are too long for practical purposes.

Ferroelectric, quick-response polymeric liquid crystals should therefore be particularly suitable for the production of flexible displays.

It would be particularly advantageous to produce a display film by a continuous process in which quick-response polymeric ferroelectric liquid crystals are incorporated. The present invention accordingly provides novel, polymeric, ferroelectric liquid crystals.

The novel compounds are polymers which are composed of repeating units of the formula (I):

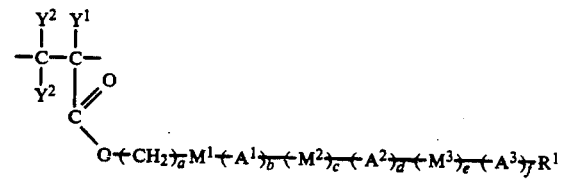

in which
$Y^1 = H$, $CH_3$ or F
$Y^2 = H$ or F
$R^1 =$

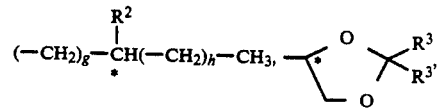

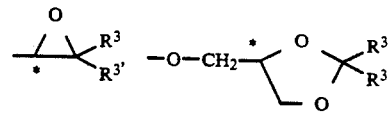

or an achiral alkyl having 2 to 16 carbon atoms, and
$R^3 = H$ or $CH_3$
$R^2 = CH_3$, Cl or CN
$g =$ an integer from 0 to 10
$h =$ an integer from 0 to 10, where h may not be 0 if $R^2 = CH_3$
$a = 2$ to 20, preferably 6 to 12
$b, c, d, e$ and $f = 0$ or 1, where $d + e + f = 2$ or 3
$A^1, A^2$ and $A^3 =$ identical or different 1,4-phenylene in which one or two hydrogen atoms may be substituted by F, Cl and or CN, 1,4-cyclohexylene, 2,5-pyrazinediyl, 3,6-pyridazinediyl, 2,5-pyridinediyl, 3,6-pyrimidinediyl, (1,3,4)-thiadiazole-2,5-diyl, 1,3-dioxan-2,5-diyl, or 1,3-dithian-2,5-diyl, with the proviso that at least one of the radicals $A^1$, $A^2$ or $A^3$ is not 1,4-phenylene.
$M^2$ and $M^3 =$ identical or different CO—O, O—CO, CO—S, S—CO, $CH_2O$, $OCH_2$ or $CH_2CH_2$

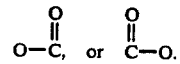

Preference is given to polymers which are composed of 50 to 90% of units of the formula (I) in which
$Y^1 = H$, $CH_3$ or F
$Y^2 = H$
$R^1 =$

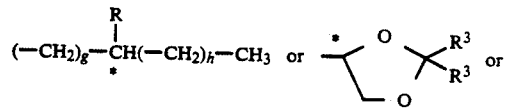

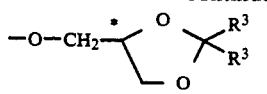

a=6 to 12, and b,c,d,e,f,g,h,$R^2$,$R^3$,$A^1$,$A^2$,$A^3$,$M^1$,$M^2$ and $M^3$ have the meanings given above, and also of 10 to 50% of units of the formula (I) in which $R^1$ is an achiral alkyl having 2 to 16 carbon atoms and $Y^1$,$Y^2$,a,b,c,d,e,f,$A^1$,$A^2$,$A^3$,$M^1$,$M^2$ and $M^3$ have the meanings given above.

Particular preference is given to a ferroelectric, liquid-crystalline polymer composed of units of the formula (I) in which $Y^1$=H or $CH_3$ $Y^2$=H a=6 to 12

$A^1$,$A^2$ and $A^3$ identical or different 1,4-phenylene in which one or two hydrogen atoms may be substituted by F, Cl and/or CN, 1,4-cyclohexylene, 2,5-pyrazinediyl, 3,6-pyridazinediyl, 2,5-pyridinediyl, 2,5-pyrimidinediyl, with the proviso that at least one of the radicals $A^1$, $A^2$ and $A^3$ is not 1,4-phenylene $M^2$ and $M^3$=identical or different CO—O, O—CO, $CH_2O$, $OCH_2$ or $CH_2CH_2$, $M^1$=

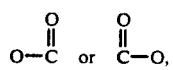

and $R^1$=

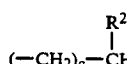

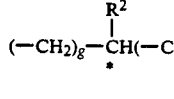

and $R^2$,$R^3$,b,c,d,e,f,g and h have the meanings given above.

Particular preference is also given to those ferroelectric, liquid-crystalline polymers of the formula (I) in which the group $(—A^1)_b(—M^2)_c(—A^2)_d(—M^3)_e(—A^3)_f—$ denotes:

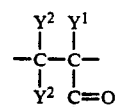

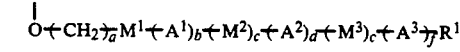

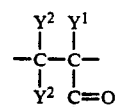

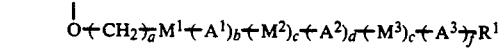

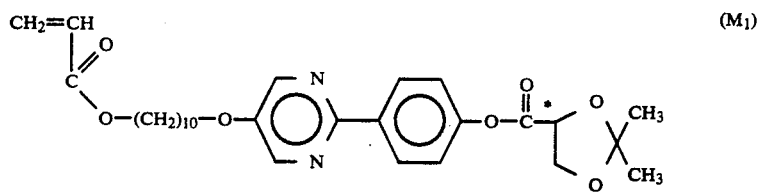

The said polymers are prepared by free-radical polymerization of monomers of the formula (II)

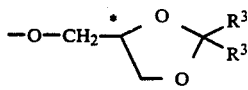

The monomers can be prepared by known processes.

EXAMPLE 1

Preparation of the Monomer ($M_1$)

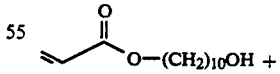

Method

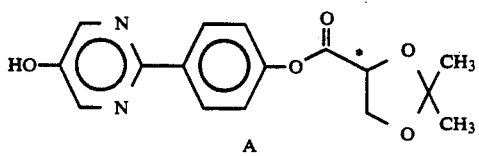

A solution of 0.70 g (4 mmol) of diethyl azodicarboxylate in 20 ml of THF is added dropwise to a solution of 1.26 g (4 mmol) of A, 0.91 g (4 mmol) of B and 1.05 g (4 mmol) of triphenylphosphine. After stirring overnight, the precipitate is separated off, the solution concentrated, and the residue purified by chromatography on flash-silica gel (eluent CH$_2$Cl$_2$/petroleum ether).

Yield: 700 mg; m.p. 83.5°-84° C.; $[\alpha]_D^{RT}=+6.9°$ (1.08 in CHCl$_3$).

Polymerization (P1)

6.36 mg (1.21 mmol) of the above monomer (M$_1$) are polymerized using 2 mg (0.012 mmol) of AIBN in 6 ml of dry THF for a period of 18 h at 60° C. The polymer is then precipitated and reprecipitated several times, using methanol.

Yield: 480 mg (75%).
Molecular weight M$_w$=7,600 g/mol
Molecular dispersity E=M$_w$/M$_n$=1.38
The liquid-crystalline polymer has the following phase transition temperatures:

T$_G$ 50 S$_C$*97,5 S$_A$ 113/   (determined by DSC)

The table which follows shows the temperature dependence of the response times (measurements at 25 volts; 2 μm cell)

| T [°C.] | 55 | 60.2 | 66.0 | 69.9 | 74.8 | 80.4 | 85 |
|---|---|---|---|---|---|---|---|
| τ [ms] | 53 | 28 | 10 | 5 | 3.2 | 1.4 | 1.5 |

EXAMPLE 2

Preparation of the Monomer (M$_2$)

imide and 37 mg (0.3 mmol) of dimethylaminopyridine in 10 ml of absolute THF for 24 h at room temperature. The mixture is then filtered, the filtrate evaporated in vacuo and the residue purified by chromatography.
Yield: 1.0 g (97%).

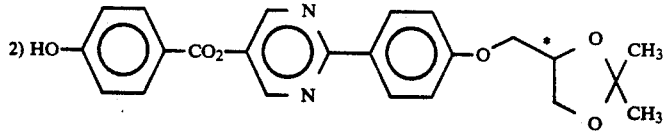

The product of the above reaction is hydrogenated in THF/EtOH (4:1) in the presence of Pd/charcoal. After the catalyst has been filtered off, the solvent is evaporated off and the product is recrystallized from acetone.
Yield: 300 mg; m.p. 208° C.

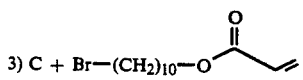

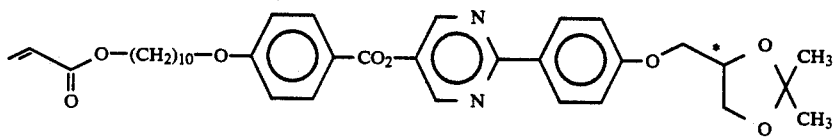

1.69 g (4 mmol) of C, 0.92 g (4 mmol) of ω-bromodecyl acrylate, 1.05 g (4 mmol) of triphenylphosphine and 0.7 g (4 mmol) of DEAD are reacted in 50 ml of THF for 40 h at room temperature. The crude product is purified by chromatography using CH$_2$Cl$_2$ as the eluent and is recrystallized from acetone.
Yield: 1.32 g (52%); m.p. 115° C.; $[\alpha]_D^{20}+4.2°$ (C=1.15 in CHCl$_3$)

Polymerization (P$_2$)

500 g of monomer and 2 mg of AIBN are stirred in 6 ml of THF for 17 minutes at 60° C. under an atmosphere of N$_2$. The polymer is precipitated using methanol and is reprecipitated several times from THF using methanol.

Yield: 340 mg; M$_w$=9,500
E=1.33
The polymer has the following phase transition temperatures:

(DSC): T$_G$ 50 S$_X$ 127.5 S$_C$*187 S 220 I

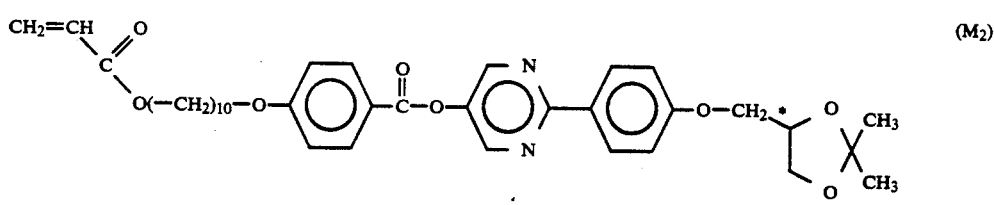

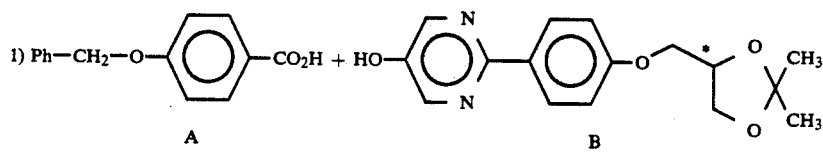

456 mg (2 mmol) of A and 609 mg (2 mmol) of B are stirred with 412 mg (2 mmol) of dicyclohexylcarbodi-

We claim:

1. A ferroelectric, liquid-crystalline polymer comprising repeating units of the formula (I)

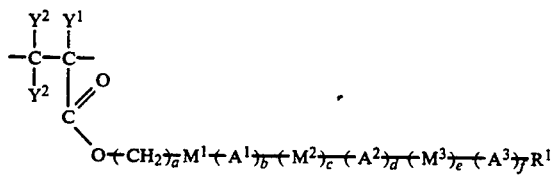

in which
Y$^1$=H or CH$_3$
Y$^2$=H
R$^1$=

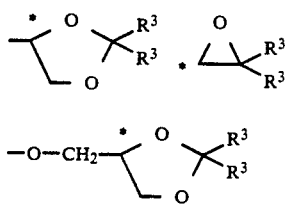

or an achiral alkyl having 2 to 16 carbon atoms, and
R$^3$=H or CH$_3$ a=2 to 20
b, c, d, e and f=0 or 1, where d+e+f=2 or 3
A$^1$, A$^2$ and A$^3$=identical or different 1,4-phenylene or 3,6-pyrimidinediyl, with the proviso that at least one of the radicals A$^1$, A$^2$ or A$^3$ is not 1,4-phenylene
M$^2$ and M$^3$=identical or different CO—O or O—CO
M$^1$= O.

2. The ferroelectric, liquid-crystalline polymer as claimed in claim 1, where it is comprising 50 to 90% of units of the formula (I) in which
Y$^1$=H or CH$_3$
Y$^2$=H
R$^1$=

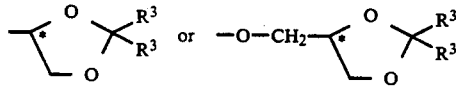

a=6 to 12, and
b, c, d, e, , R$^3$, A$^1$, A$^2$, A$^3$, M$^1$, M$^2$ and M$^3$ have the same meanings as in claim 1, and also of 10 to 50% of units of the formula (I) in which
R$^1$ is an achiral alkyl having 2 to 16 carbon atoms and Y$^1$, Y$^2$, a, b, c, d, e, f, A$^1$, A$^2$, A$^3$, M$^1$, M$^2$ and M$^3$ have the meanings given above.

3. An electrooptical component, which comprises a polymer as claimed in claim 1.

4. An electrooptical component, which comprises a polymer as claimed in claim 2.

* * * * *